(12) United States Patent
Miller et al.

(10) Patent No.: US 6,828,059 B2
(45) Date of Patent: Dec. 7, 2004

(54) METHOD FOR PROVIDING A CURRENT COLLECTOR WITH BARE REGIONS TO FACILITATE WINDING

(75) Inventors: Robert D. Miller, Lancaster, NY (US); Tina L. Urso, East Amherst, NY (US); Paul T. Hallifax, Gasport, NY (US)

(73) Assignee: Wilson Greatbatch Technologies, Inc., Clarence, NY (US)

(*) Notice: Subject to any disclaimer, the term of this patent is extended or adjusted under 35 U.S.C. 154(b) by 91 days.

(21) Appl. No.: 10/224,117

(22) Filed: Aug. 20, 2002

(65) Prior Publication Data

US 2002/0192558 A1 Dec. 19, 2002

Related U.S. Application Data

(62) Division of application No. 09/591,148, filed on Jun. 9, 2000, now Pat. No. 6,461,759.

(51) Int. Cl.[7] .............................................. H01M 4/00
(52) U.S. Cl. ..................... 429/94; 429/127; 429/153; 429/162; 429/185
(58) Field of Search .................... 429/94, 127, 153, 429/162, 185, 160

(56) References Cited

U.S. PATENT DOCUMENTS

| | | | |
|---|---|---|---|
| 3,663,721 A | | 5/1972 | Blondel et al. |
| 4,622,277 A | | 11/1986 | Bedder et al. |
| 5,154,993 A | * | 10/1992 | Beatty .......................... 429/211 |
| 5,478,668 A | | 12/1995 | Gozdz et al. |
| 5,552,239 A | | 9/1996 | Gozdz et al. |
| 5,750,286 A | | 5/1998 | Paulot et al. |
| 5,776,628 A | * | 7/1998 | Kraft et al. .................... 429/94 |
| 6,045,943 A | * | 4/2000 | Nowaczyk .................... 429/160 |

* cited by examiner

Primary Examiner—Dah-Wei Yuan
(74) Attorney, Agent, or Firm—Michael F. Scalise

(57) ABSTRACT

An electrode assembly constructed of continuous anode and cathode electrodes that are overlaid in overlapping fashion and wound into a cell stack suitable for prismatic and cuboidal-shaped cases. The cathode electrode strip has some regions where the electrode material is pressed to a high density and has some regions where the active material is substantially removed from the current collector screen.

12 Claims, 7 Drawing Sheets

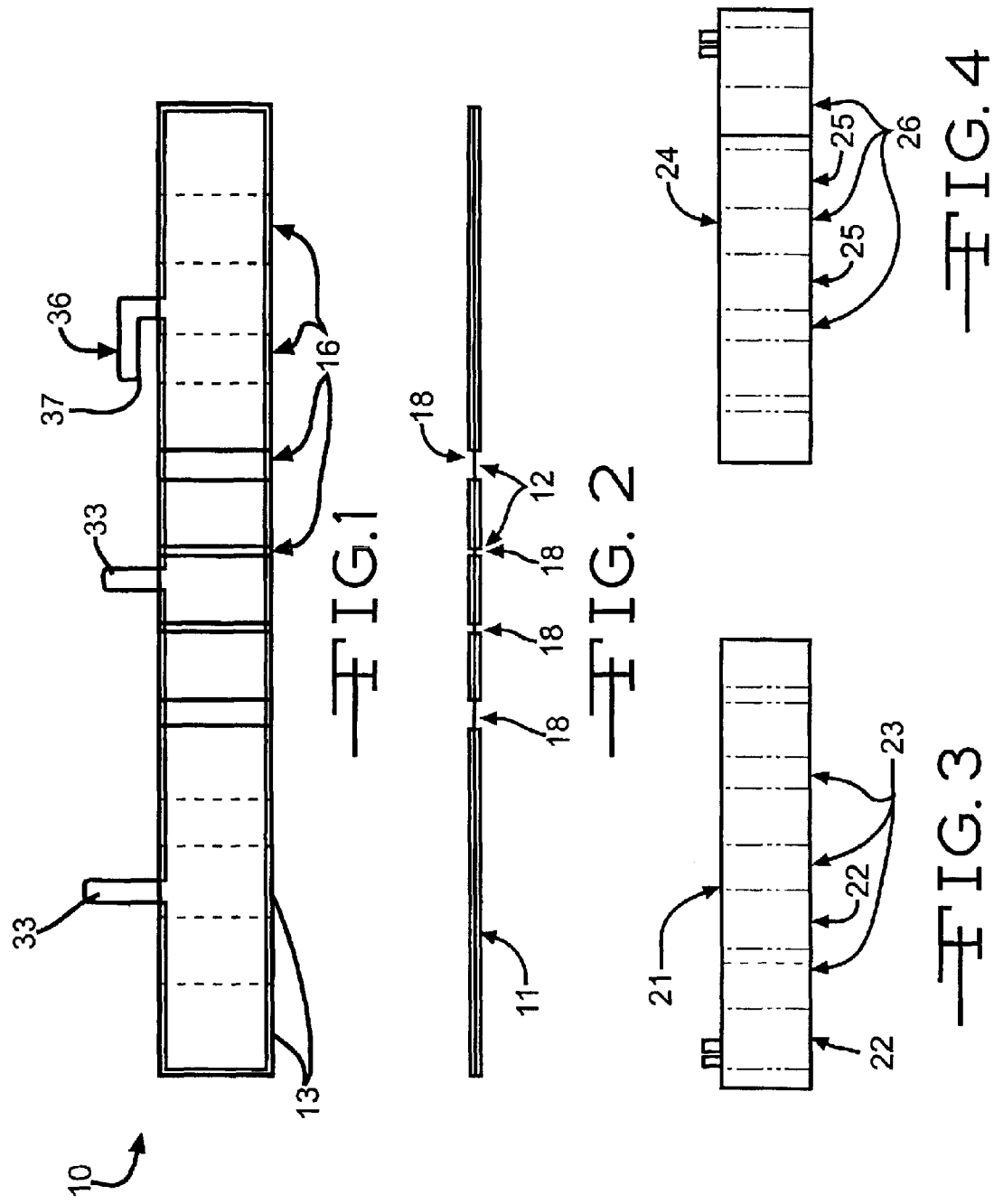

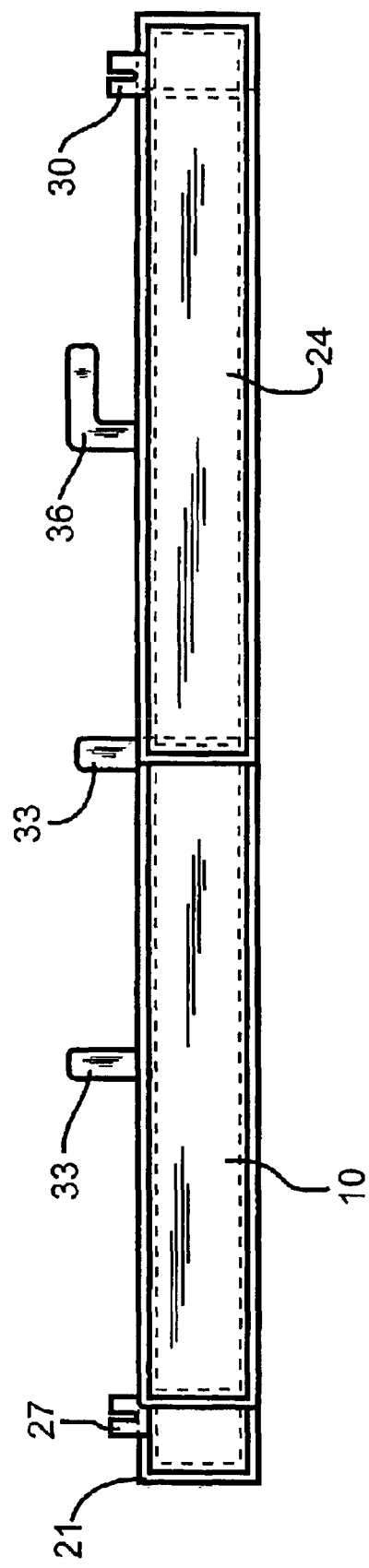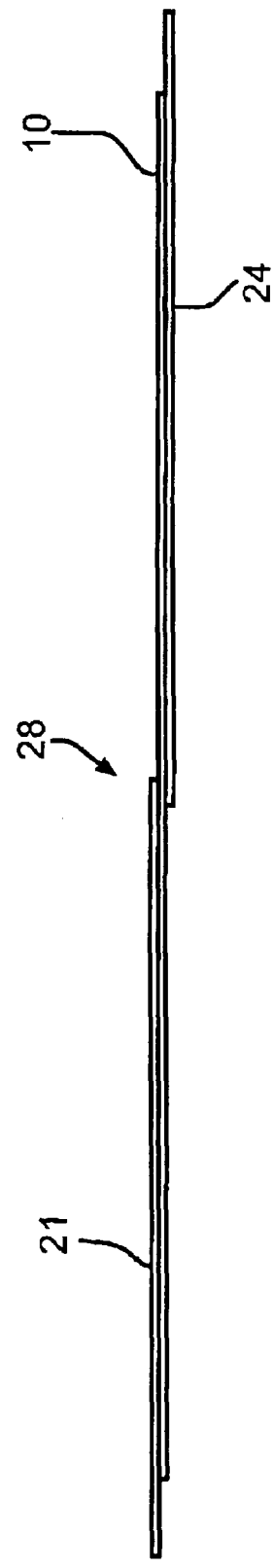

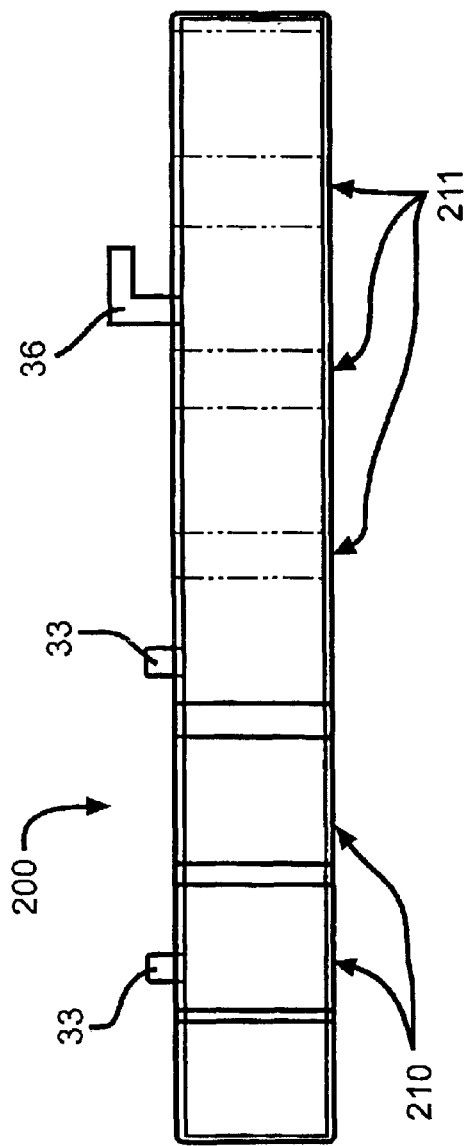
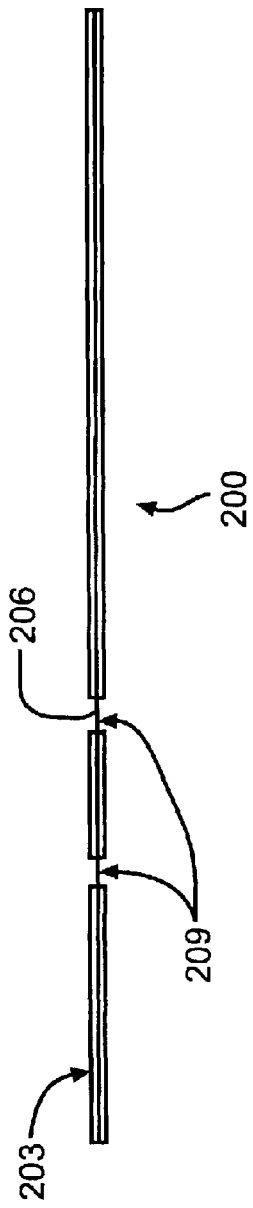

METHOD FOR PROVIDING A CURRENT COLLECTOR WITH BARE REGIONS TO FACILITATE WINDING

CROSS-REFERENCE TO RELATED APPLICATION

This application is a divisional of application Ser. No. 09/591,148, filed Jun. 9, 2000, now U.S. Pat. No. 6,461,759 to Miller at al.

FIELD OF THE INVENTION

The present invention generally relates to the art of electrochemical energy, and more particularly, to an electrode assembly, electrochemical cells in which the electrode assembly is used and a method for making the electrode assembly.

BACKGROUND OF THE INVENTION

Batteries or electrochemical cells are typically volumetrically constrained systems which cannot exceed the available volume of the battery case. The size and resulting volume of the battery case are dictated by the space requirements available for the particular application. The components that make up a battery namely, the cathode electrode, the anode electrode, the separator, the current collectors, and the electrolyte all have to fit into the limited space defined by the battery case. Therefore, the arrangement of the components impacts on the volume of electrode active material that can fit into the case and the ease of manufacturing the unit.

Some typical electrode assemblies that attempt to maximize volumetric efficiency include the "Z" folded electrode assembly which is disclosed in U.S. Pat. No. 3,663,721 to Blondel et al. In the "Z" folded electrode, a unitary and continuous lithium anode is folded back and forth in a zig-zag fashion. The length of the individual folds determines the width of the electrode assembly. Individual cathode plates are positioned between pairs of the pleated anode electrode and electrically connected to one another. The design has some drawbacks including the requirement that separate cathode plates be inserted between each pair of adjacent layers of anode electrode, and the requirement that electrical connections be made between all of the inserted cathode plates. This arrangement increases the time and costs associated with manufacturing.

Another typical volumetrically efficient electrode assembly configuration is the "jelly roll" design in which the anode electrode, the cathode electrode, and the separator are overlaid with respect to each other and coiled up. Such an electrode configuration is desirable because the continuous anode and cathode electrodes require a minimal number of mechanical connections to their respective terminal leads, and the jelly roll assembly is generally recognized as preferred for high current discharge and pulse applications. The winding method is also suitable for non-cylindrical cases such as prismatic and cuboidal. In these cases, the wound cell stack has straight regions in the middle of the cell stack and bend regions at opposite ends of the cell stack.

Use of the winding method often limits the density of the electrodes because as an electrode is pressed more densely to its current collector it becomes more brittle and has a greater tendency to crack and flake off the screen, especially when wound about a small radius bend. Also, the electrode material may delaminate along the length of the electrode causing the material to lose contact with the current collector screen.

Because the stacked or flat folded plates do not create the stresses in the bend regions that are associated with winding, the plate method has been able to accommodate higher density electrodes and, therefore, has traditionally provided a cell stack of higher total electrode weight and capacity than is possible using the wound method.

What is needed is an improved wound cell stack with a high density electrode for use in a prismatic (cuboid-shaped) or other non-cylindrical case.

SUMMARY OF THE INVENTION

The present invention meets the above-described need by providing a wound electrode having some regions where the electrode material is pressed to a high density and having some regions where the active material is substantially removed from the current collector screen. The wound electrode has some regions that lie in the "flat" and some regions that are curved. Moving from the inside of the wound cell stack to the outside of the stack, the bend regions have increasing radii. The flat regions and the bend regions having a longer radius curve are pressed to a high density similar to a cell stack formed from the plate method. In bend regions making relatively "tight" or short radius turns, the active material is substantially removed from the current collector. By removing material from these regions, electrode material flaking off the screen and delamination, which could spread along the length of the strip from the bend region to the straight region, is avoided.

In a preferred embodiment, a wound electrode cell stack has electrode material removed from both sides of the current collector screen in the regions corresponding to the shorter radius turns. The material may be removed completely from the current collector screen or it may be partially removed. Also, the material may be removed from one or both sides of the current collector screen.

In an alternate embodiment, a wound electrode cell stack has electrode material removed in the short radius bend regions for both the cathode electrode and the anode electrode.

The present invention also includes a method of manufacturing a wound cell stack as described above. The method includes the steps of pressing the electrode active material onto the current collector screen to a high density. Next, electrode active material is removed from the electrode in predetermined regions of the strip such that the regions where material is removed from the strip correspond to the regions where the shortest radius curves are formed in the wound cell stack. The material is removed either mechanically or through ultrasonic methods, and the material may be removed partially or completely.

With the material removed, the cathode electrode strip is placed in alignment with the anode strip and the strips are then wound as described herein.

BRIEF DESCRIPTION OF THE DRAWINGS

FIG. 1 is a plan view of a cathode electrode strip of the present invention;

FIG. 2 is a side elevation view of the cathode electrode strip shown in FIG. 1;

FIG. 3 is a plan view of a first anode electrode strip;

FIG. 4 is a plan view of a second anode electrode strip;

FIG. 5 is a plan view of the combined cathode and anode electrode strips prior to winding;

FIG. 6 is a side elevational view of the combined cathode and anode electrode strips prior to winding;

FIG. 13 is a plan view of an alternate embodiment of the cathode electrode strip suitable for use in a "jelly roll" wound cell stack;

FIG. 14 is a side elevational view of the cathode electrode strip shown in FIG. 13;

DETAILED DESCRIPTION OF THE INVENTION

The present invention is designed for high energy devices such as batteries and capacitors and is adaptable in a wide variety of electrode configurations and shapes for such applications as capacitors and batteries including aqueous and nonaqueous primary and secondary batteries.

In FIGS. 1–2, a cathode electrode 10 is shown. The cathode electrode 10 is preferably formed initially from a continuous strip of active material 11 contacting a conductive member serving as a cathode current collector 12. The active material 11 (FIG. 2) is pressed onto the current collector 12 (FIG. 2) to a high density through a process that is known to those of ordinary skill in the art. The active material 11 is preferably a metal, a metal oxide, a metal sulfide, a mixed metal oxide or a carbonaceous material. The cathode current collector 12 is preferably comprised of conductive material such as of a conductive screen and the like.

Figure 7:
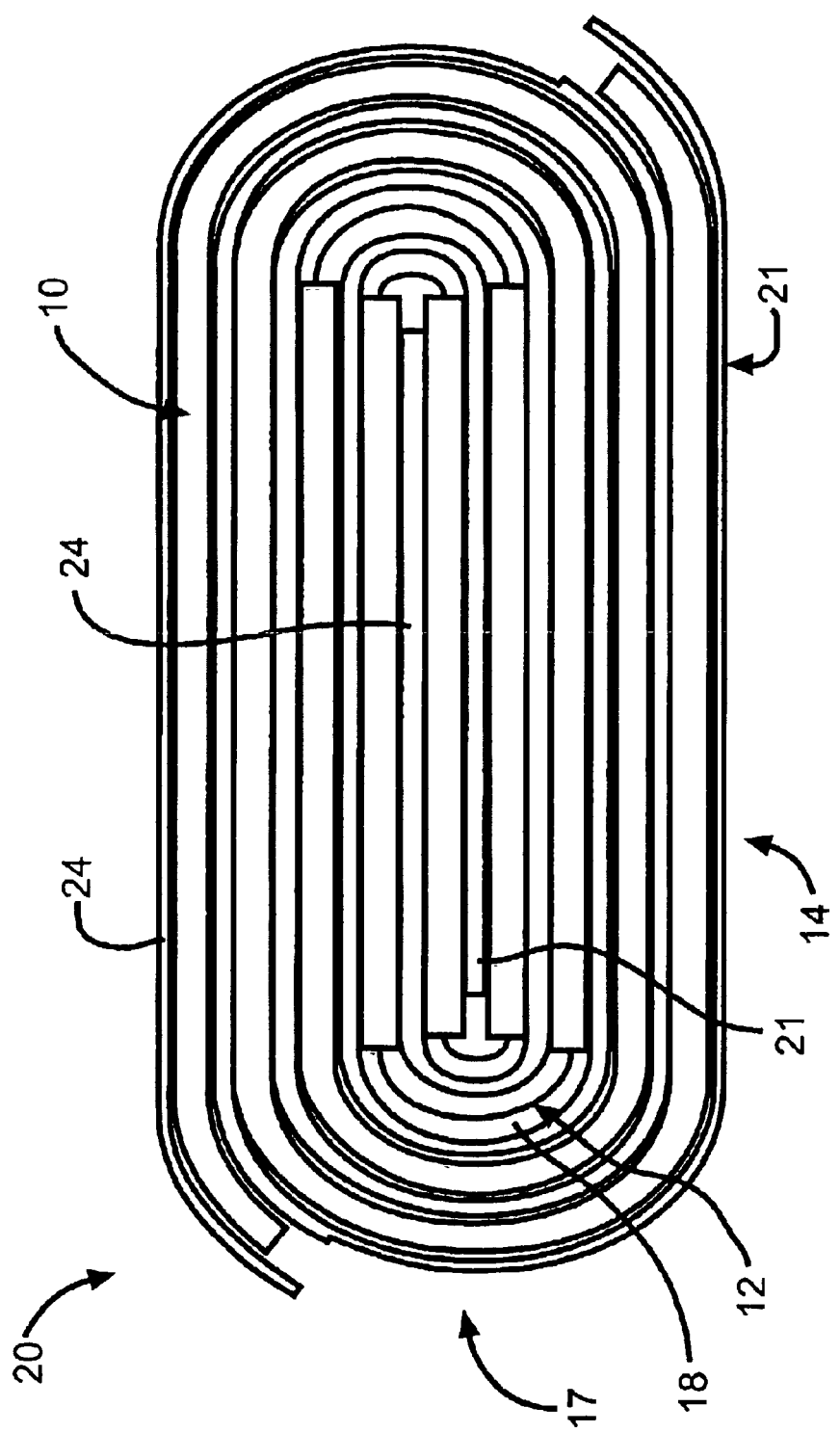
FIG. 7 is a side elevational view of the wound cell stack with bare regions in the cathode electrode.
Figure 10:
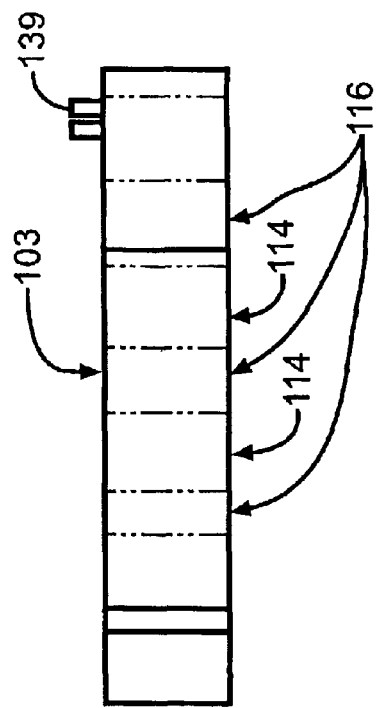
FIG. 10 is a plan view of an alternate embodiment of the second anode electrode strip where anode active material has been removed from the current collector.
Figure 11:
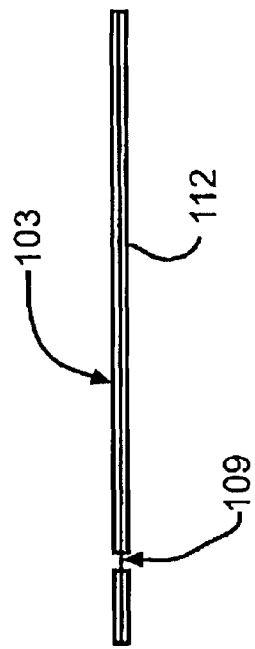
FIG. 11 is a side elevational view of the second anode electrode strip shown in FIG. 10.
Figure 8:
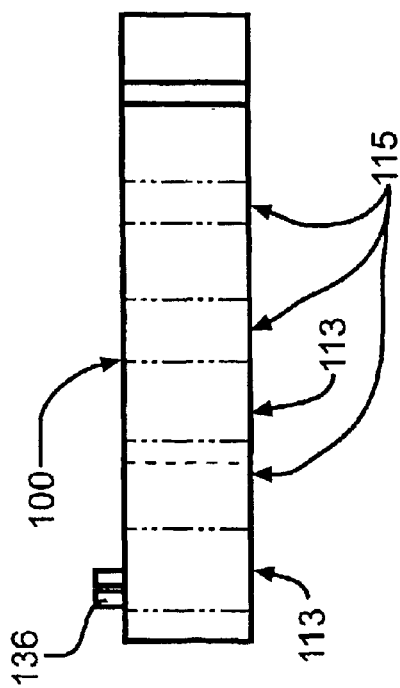
FIG. 8 is a plan view of an alternate embodiment of the first anode electrode strip where anode active material has been removed from the current collector.
Figure 9:
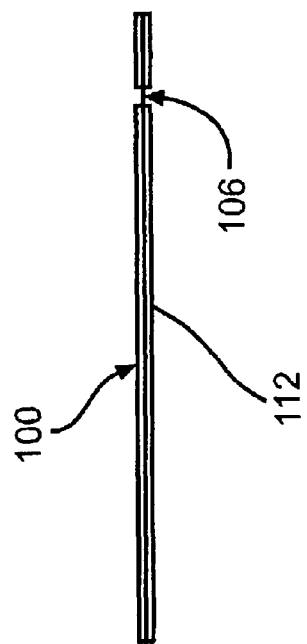
FIG. 9 is a side elevational view of the first anode electrode strip shown in FIG. 8.

The cathode electrode 10 has a plurality of regions 13 that correspond to the flat or straight regions 14 shown in the final wound cell stack (FIG. 7). The electrode 10 also has a plurality of regions 16 that correspond to the bend regions 17 (FIG. 7) in the final wound cell stack 20. Starting at the left end of the cathode electrode strip 10, the flat regions 13 are disposed such that there is a bend region 16 between each successive flat region 13. The bend regions 16 become progressively shorter toward the center of the electrode strip 10. The most centrally located bend regions 16 correspond to the shortest radii curves in the final wound cell stack 20. The shortest radii curves in the wound cell stack 20 generate the greatest stresses. For example, when the cathode electrode is curved during the winding process, the cathode active material 11 on the inside of the strip is compressed and the material 11 on the outside of the strip is placed under tension. Accordingly, the sharpest or tightest (smallest radius) sections of the wound cell stack assembly 20 are most likely to cause failures manifested by flaking off or delamination of the material from the current collector screen along the length of the electrode.

Accordingly, turning to FIG. 2, the bend regions 16 toward the center of the electrode strip 10 are the regions that are most in need of relief from the stresses associated with winding. As a result, according to the present invention, the bend regions 16 toward the center of the electrode strip 10 have electrode active material 11 removed therefrom to form bare regions 18. The material 11 may be removed completely down to the bare current collector screen 12 or the material 11 may be partially removed from these regions 18. In FIG. 2, the material 11 is removed from both sides of the current collector screen 12 down to the bare screen 12; however, the material 11 may be removed from only one side of the current collector screen and may be removed to various depths.

The material 11 may be removed from the screen 12 in the bare regions 18 in many ways including mechanically and ultrasonically. If the material is to be removed mechanically, a precision tool (not shown) for mechanically removing the material from the screen 12 is provided. The preferred tool is a machine tool that is indexed to a predetermined location along the cathode electrode 10 and then lowered to the proper depth relative to the current collector screen 12. The machine tool then scrapes the material off of the screen 12. As an alternative to the machine tool, an ultrasonic device (not shown) can also be provided. As known to those of ordinary skill in the art, the ultrasonic device has a horn with openings corresponding to the regions where material is to be removed. The ultrasonic device is brought into spaced apart relation to the electrode strip 10 such that the openings in the horn align with the areas where material is to be removed. The vibrations generated by the device cause the material 11 to be removed from the desired locations along the cathode electrode 10.

Once the cathode electrode 10 is provided with the bare regions 18 shown in FIG. 2 where material has been removed, a separator (not shown) and a pair of electrode strips 21 and 24 (FIGS. 3–4) are placed in alignment with the cathode electrode strip 10. The anode strips 21, 24 have regions 22 and 25 that correspond to the flat regions 14 of the final wound stack 20 and have regions 23, 26 that correspond to the bend regions 17 of the final cell stack 20. The anode electrodes 21, 24 have connectors 27, 30 for connecting to the case in a case negative design as known to those of ordinary skill in the art. The combined anode strip, electrode strip, and separator are then overlayed as shown in FIGS. 5–6. Next, the electrodes are wound around a mandrel disposed in the center of the combined strips as shown and described in co-pending patent application Ser. No. 09/262,245 entitled Wound Stack for Enhanced Battery Performance, which is assigned to the assignee of the present invention and which is incorporated herein by reference.

Returning to FIG. 1, the electrode assembly 10 also has electrical connectors 33 and 36 for connecting to the case and/or the terminal pin. The connector 36 has an elongate section 37 for connecting to the terminal pin as shown and described in U.S. Pat. No. 5,750,286 to Muffoletto et al., which is assigned to the assignee of the present invention and which is incorporated herein by reference.

Turning to FIG. 7, the wound cell stack 20 of the present invention includes continuous anode and cathode electrodes (10, 21, 24) wound such that they are disposed in flat regions 14 and bend regions 17. The flat regions 14 correspond to regions 13 of the cathode electrode where the electrode active material 11 is pressed to a high density comparable to the densities used with flat folded electrode assemblies. The bend regions 17 near the outside of the wound cell stack 20 are also pressed to a high density. In contrast, the bend regions 17 closer to the center of the stack 20 preferably correspond to the bare regions 18 of the cathode assembly 10 where electrode active material 11 has been removed down to the bare current collector screen 12 to facilitate the winding of the cell stack 20. These bare regions 18 facilitate the winding of the cell stack 20 by preventing delamination from occurring along the longitudinal axis of the cathode electrode 10. If bare regions 18 are not provided, the electrode active material 11 may start to peel away from the cathode current collector 12 in the bend regions 17 and spread down the longitudinal axis into the straight regions 14. The discontinuity provided by the regions 16, where electrode active material is removed, prevents delamination from developing.

Turning to FIGS. 8–11, anode electrode strips 100 and 103 provide bare regions 106 and 109 where anode active material 112 has been removed according to the techniques described above. The regions 106 and 109 (best shown in FIGS. 9 and 11) correspond to the tight anode bend regions in the wound cell stack. The anode strips 100, 103 have regions 113, 114 that correspond to the flat regions 125 in FIG. 12. Anode strips 100, 103 also have regions 115, 116 that correspond to the bend regions 128 shown in FIG. 12. Also, the anode strips 100, 103 include electrical connectors 136, 139.

Figure 12:
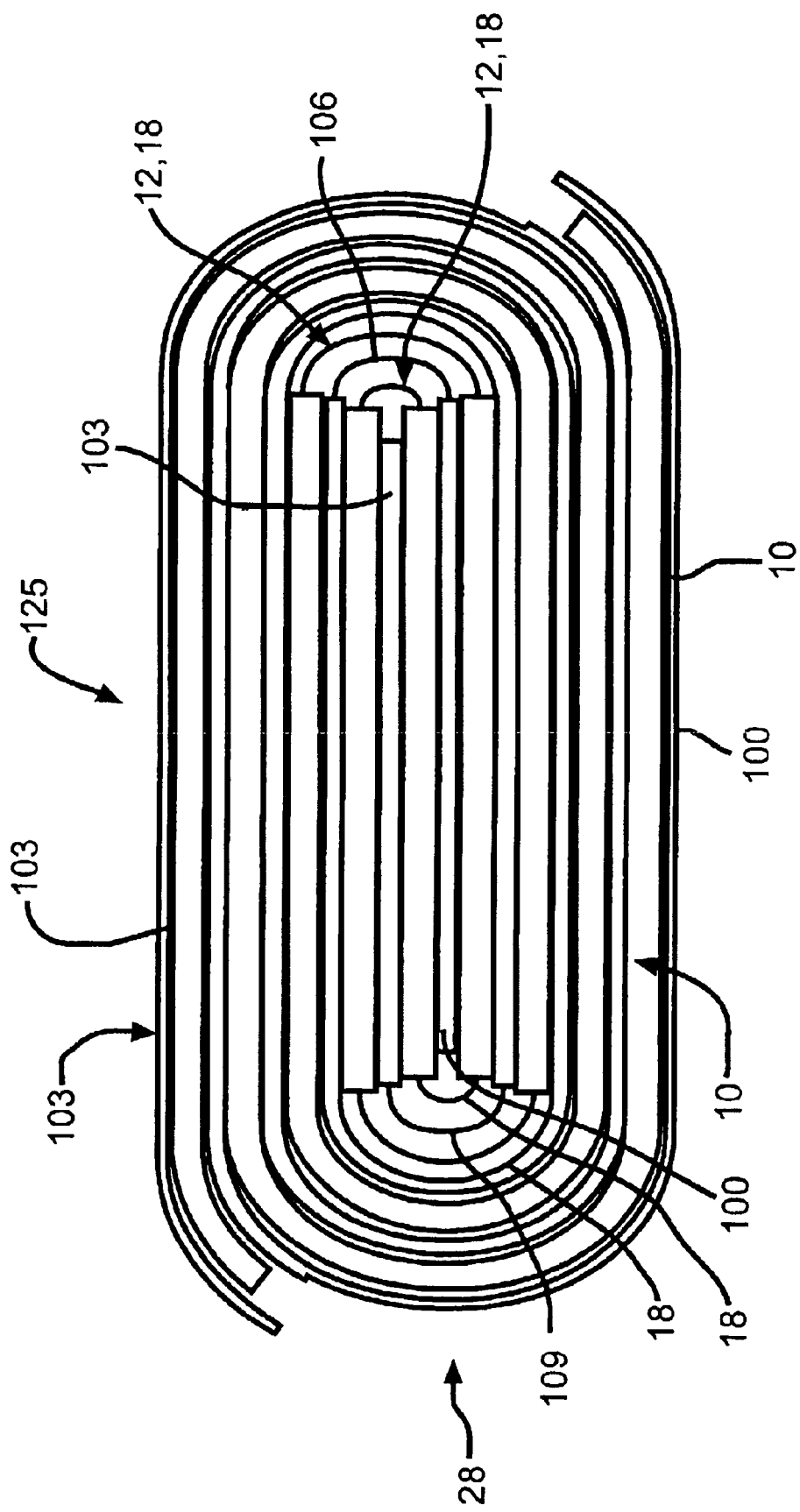
FIG. 12 is a side elevational view of the wound cell stack of the present invention with bare regions for the tight cathode and anode bends.

As shown in FIG. 12, when the cathode electrode 10 is wound with anode strips 100 and 103 according to the method shown and described in connection with FIGS. 1–6, the bare regions of the cathode electrode assembly 10 and the anode electrodes 21 and 24 correspond to the tight cathode and anode bend regions. Bare current collector regions 18 and 106 and 109 are shown in the tightest bends of the wound cell stack.

In FIGS. 13–14 an alternate cathode electrode assembly 200 is shown. Cathode electrode assembly 200 also includes an active material 203 pressed to a current collector screen 206. The cathode electrode assembly 200 is designed for a "jelly roll" wound cell stack. With regard to the orientation of the cathode electrode strip 200 shown in FIGS. 13–14, the wound cell stack is formed by overlaying a separator and a unitary anode electrode strip (not shown) having approximately the same length as the cathode electrode 200, placing a mandrel (not shown) at the left hand end of the cathode, and rolling the combined cathode and anode electrodes from left to right in a "jelly roll" fashion. The cathode electrode 200 also includes regions 209 where active material has been removed according to the above-described techniques. The regions 209 correspond to tight cathode bend regions in the final wound cell stack assembly. The cathode electrode 200 has regions 210 that correspond to the flat regions of a wound stack and has regions 211 that correspond to the bend regions of a wound stack.

Figure 15:
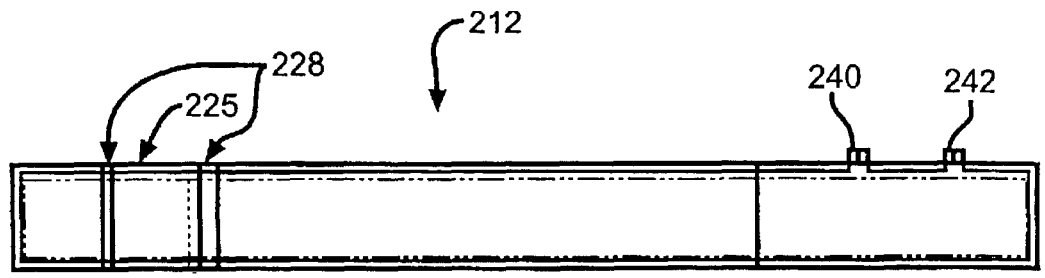
FIG. 15 is a plan view of an alternate embodiment of the anode electrode strip suitable for use in a "jelly roll" wound cell stack.
Figure 16:
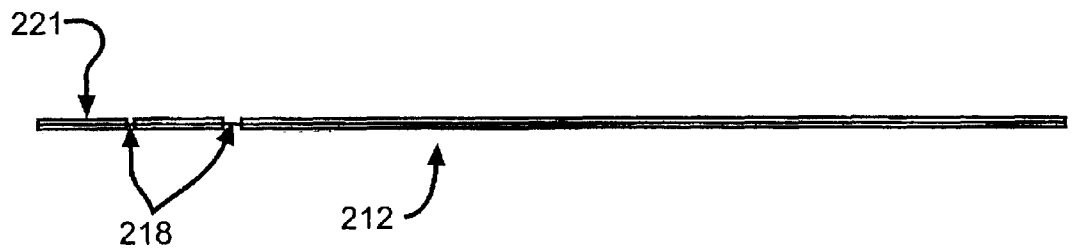
FIG. 16 is a side elevational view of the anode electrode strip shown in FIG. 15; and, FIG. 17 is a side elevational view of a "jelly roll" wound cell stack with bare regions for the tight cathode and anode bends.

As shown in FIGS. 15–16, an anode electrode strip 212 suitable for the jelly roll wound cell stack may also be provided with bare regions 218 where anode active material has been removed. The anode electrode 212 has regions 225 that correspond to the flat regions 250 in FIG. 17 and has regions 228 that correspond to the bend regions 260 shown in FIG. 17. With reference to the orientation of FIGS. 15–16, the anode electrode 212 is overlayed on the cathode electrode 200 with a separator (not shown) disposed between.

Figure 17:
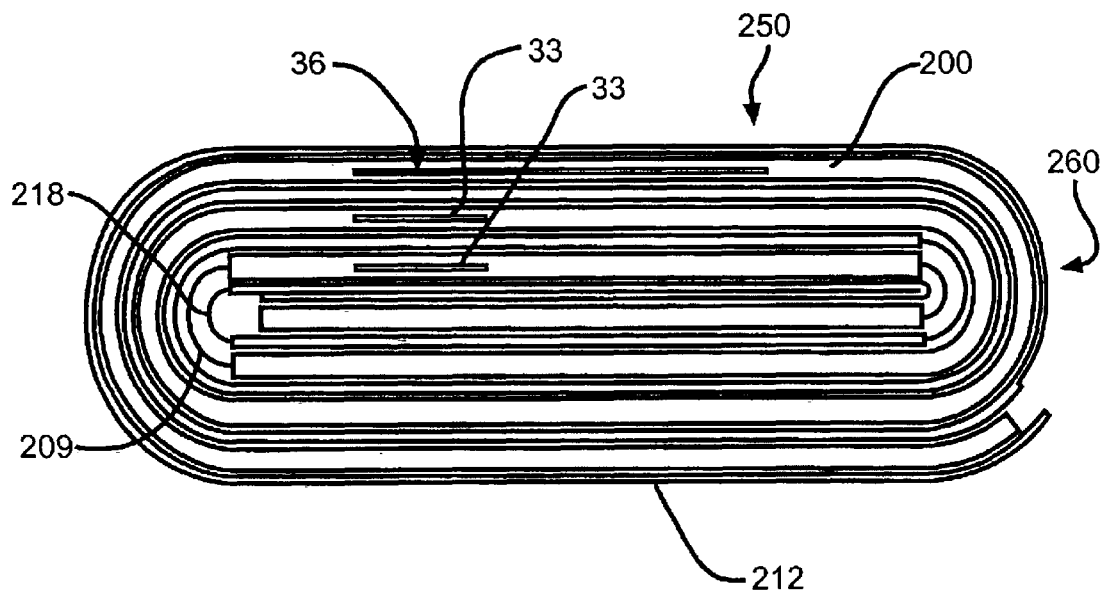

The combined anode and cathode electrode assembly is then rolled around a mandrel from the left to the right hand side of the figures. The resulting wound cell stack shown in FIG. 17 provides regions where active material has been removed that correspond to the tight cathode and anode bend regions.

Accordingly, the present invention provides several advantages. By utilizing continuous anode and cathode electrode strips, the device provides for elimination of the extra connections for "like" plates associated with some of the plate designs. These extra connections required by other designs do not contribute to the capacity or surface area of the active materials. The present invention also provides for a cell with a higher capacity than a cell stack constructed of all high density plates or one constructed of uniformly low density wound elements. Also, the present invention provides for bending of the electrode without cracking of the active material in the tight bend regions. The present invention increases the capacity density of the cell by about ten percent or more depending on the case aspect ratio.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A method for forming an electrode assembly, comprising the steps of:
   a) providing an anode electrode comprising an anode current collector having an anode active material contacted thereto;
   b) providing a cathode electrode comprising a cathode current collector having a cathode active material contacted thereto, wherein at least one of the anode current collector and the cathode current collector has a generally rectangular shape provided by spaced apart first and second ends extending to and meeting with opposed generally straight first and second edges extending continuously along a length of the at least one current collector between the first and second ends, and wherein the at least one current collector is provided with the anode active material or the cathode active material as the case may be contacted to at least one of its major sides and extending substantially from the first edge to the second edge;
   c) removing the anode active material or the cathode active material from the at least one major side of the at least one current collector in a plurality of predetermined regions extending from the first to the second edges of the current collector; and
   d) winding the anode electrode and the cathode electrode into a wound cell stack having at least three straight regions with substantially U-shaped bend regions connecting between the straight regions, the bend regions being where the anode active material or the cathode active material has been removed.

2. The method of claim 1 including mechanically removing the anode active material or the cathode active material from the at least one major side of the at least one current collector.

3. The method of claim 1 including ultrasonically removing the anode active material or the cathode active material from the at least one major side of the at least one current collector.

4. The method of claim 1 including removing the cathode active material only from a first side of the cathode current collector.

5. The method of claim 1 including removing the cathode active material from both sides of the cathode current collector.

6. The method of claim 1 including providing the wound cell stack having multiple bend regions comprising one of a shortest radius, one of a largest radius and at least one of an intermediate radius and removing the cathode active material from the cathode current collector in at least two bend regions having the shorter radii.

7. The method of claim 1 including providing the wound cell stack having multiple bend regions comprising one of a shortest radius, one of a largest radius and at least one of an intermediate radius and removing the anode active material from the anode current collector in at least two bend regions having the shorter radii.

8. The method of claim 7 including removing the anode active material only from a first side of the anode current collector.

9. The method of claim 7 including removing the anode active material from both sides of the anode current collector.

10. A method for forming an electrode assembly, comprising the steps of:
   a) providing an elongate continuous anode electrode strip comprising an anode current collector having an anode active material contacted thereto;
   b) providing an elongate continuous cathode electrode comprising a cathode current collector having a cathode active material contacted thereto; and
   c) ultrasonically removing at least one of the anode active material and the cathode active material from the respective anode current collector and the cathode current collector in predetermined regions such that when the anode electrode and the cathode electrode are wound around each other to form a wound cell stack having straight regions and bend regions, the regions where the at least one of the anode active material and the cathode active material has been removed are located in at least one of the bend regions of the wound cell stack.

11. A method for forming an electrode assembly, comprising the steps of:
   a) providing an anode electrode comprising an anode current collector having an anode active material contacted thereto;
   b) providing a cathode electrode comprising a cathode current collector having a cathode active material contacted thereto, wherein the cathode current collector has a generally rectangular shape provided by spaced apart first and second ends extending to and meeting with opposed generally straight first and second edges extending continuously along a length of the cathode current collector between the first and second ends, and wherein the cathode current collector is provided with the cathode active material contacted to least one its major sides and extending substantially from the first edge to the second edge;
   c) removing the cathode active material from the cathode current collector in a plurality of predetermined regions extending from the first to the second edges of the current collector; and
   d) winding the anode electrode, and the cathode electrode into a wound cell stack having at least three straight regions with substantially U-shaped bend regions connecting between the straight regions, the bend regions being where the cathode active material has been removed.

12. A method for fanning an electrode assembly, comprising the steps of:
   a) providing an anode electrode comprising an anode current collector having an anode active material contacted thereto;
   b) providing a cathode electrode comprising a cathode current collector having a cathode active material contacted thereto, wherein at least one of the anode current collector and the cathode current collector has a generally rectangular shape provided by spaced apart first and second ends extending to and meeting with opposed generally straight first and second edges extending continuously along a length of the at least one current collector between the first and second ends, and wherein the at least one current collector is provided with the anode active material or the cathode active material as the case may be contacted to at least one of its major sides and extending substantially from the first edge to the second edge;
   c) partially removing the anode active material or the cathode active material from the at least one major side of the at least one current collector in a plurality of predetermined regions extending from the first to the second edges of the current collector; and
   d) winding the anode electrode and the cathode electrode into a wound cell stack having at least three straight regions with substantially U-shaped bend regions connecting between the straight regions, the bend regions being where the anode active material or the cathode active material has been at least partially removed.

* * * * *

UNITED STATES PATENT AND TRADEMARK OFFICE
CERTIFICATE OF CORRECTION

PATENT NO. : 6,828,059 B2
DATED : December 7, 2004
INVENTOR(S) : Robert D. Miller et al.

It is certified that error appears in the above-identified patent and that said Letters Patent is hereby corrected as shown below:

<u>Column 8,</u>
Line 12, "electrode ," should read -- electrode --; and
Line 18, "fanning" should read -- forming --.

Signed and Sealed this

Tenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,828,059 B2
DATED : December 7, 2004
INVENTOR(S) : Miller et al.

It is certified that error appears in the above-identified patent and that said Letters Patent is hereby corrected as shown below:

Title page,
Item [*] Notice, should read as follows;
-- [*] Notice: Subject to any disclaimer, the term of the patent is extended or adjusted under 35 USC 154(b) by 180 days --.

Signed and Sealed this

Twenty-third Day of August, 2005

JON W. DUDAS
*Director of the United States Patent and Trademark Office*